United States Patent
Kuhns

(10) Patent No.: US 7,490,856 B1
(45) Date of Patent: Feb. 17, 2009

(54) HEAD HAULER

(76) Inventor: Abe B. Kuhns, R. R. 1, Box 178, Arthur, IL (US) 61911

( * ) Notice: Subject to any disclaimer, the term of this patent is extended or adjusted under 35 U.S.C. 154(b) by 398 days.

(21) Appl. No.: 11/521,030

(22) Filed: Sep. 14, 2006

Related U.S. Application Data

(60) Provisional application No. 60/717,108, filed on Sep. 14, 2005.

(51) Int. Cl.
*B60P 3/00* (2006.01)

(52) U.S. Cl. .......................... 280/789; 280/781; 410/2; 410/77; 410/44; 56/228; 248/225.1; 296/26.13

(58) Field of Classification Search ................ 280/789, 280/781, 45; 410/2, 77, 44, 156; 56/228, 56/473.5; 248/674, 675, 225.1; 296/26.12, 296/26.13
See application file for complete search history.

(56) References Cited

U.S. PATENT DOCUMENTS

| | | | |
|---|---|---|---|
| 4,371,299 A * | 2/1983 | Cain et al. .................... 410/44 |
| 5,040,825 A | 8/1991 | Kuhns ........................ 280/789 |
| 5,333,904 A * | 8/1994 | Kuhns ........................ 280/789 |
| 5,361,569 A * | 11/1994 | Schupman et al. ............ 56/228 |
| 5,374,082 A * | 12/1994 | Smith ........................ 280/789 |
| 5,785,472 A * | 7/1998 | Smith et al. ................... 410/77 |
| 6,272,824 B1 * | 8/2001 | Smith et al. ................... 56/228 |
| 6,419,431 B1 | 7/2002 | Kuhns ........................... 410/2 |

* cited by examiner

*Primary Examiner*—Paul N. Dickson
*Assistant Examiner*—George D. Spisich
(74) *Attorney, Agent, or Firm*—Philip L. Bateman

(57) ABSTRACT

A head hauler has a movable longitudinal rail that is movable without tools in vertical elevation and transverse horizontal position. The movable longitudinal rail is supported by two support assemblies, each of which contains a bracket having an upper sloped surface, a screw, a coupling attached to the bracket, a threaded coupling through which the screw passes, an underlying plate that is attached to the threaded coupling, and a means for attaching the plate to the movable longitudinal rail.

5 Claims, 3 Drawing Sheets

HEAD HAULER

CROSS-REFERENCE TO RELATED APPLICATION

This application claims the benefit of U.S. Provisional Application Ser. No. 60/717,108, Sep. 14, 2005.

FIELD OF THE INVENTION

This invention relates to freight carriers. More particularly, this invention relates to carriers for the heads of combines.

BACKGROUND OF THE INVENTION

A combine is a farm machine that harvests and threshes grain as it is driven through a field. The front portion of the combine that harvests the grain is commonly known as the head. A combine typically contains interchangeable heads to enable use with different grains, including corn, soybeans, and wheat. Modern heads are typically so wide that the combines are not safely driven on most roads. Accordingly, when the combine needs to be driven from one location to another location on a road, it is common practice to first remove the head from the combine, place the head lengthwise on a carrier, and then pull the carrier. The carrier is sometimes pulled by the combine and is sometimes pulled by a truck or tractor.

A carrier specially adapted for a head is commonly known as a head hauler. Heads vary in size and construction so head haulers generally contain adjustment means to adapt to the particular head. More particularly, head haulers typically contain two longitudinal rails upon which the head rests. At least one of these rails is typically adjustable in vertical elevation and transverse horizontal position. The adjustment of the rail typically requires tools and two or more persons.

Kuhns, U.S. Pat. No. 5,040,825, issued Aug. 20, 1991, which is incorporated by reference, discloses a first head hauler with a longitudinal rail whose vertical elevation and transverse horizontal position can be changed by a single person with tools. The adjustment mechanism includes an inclined bracket with a slotted sloped surface, an underlying plate, and an overlying plate that is attached to the movable longitudinal rail. The underlying plate and the overlying plate are attached to each other with nuts and bolts. When the plates are loosened relative to each other, they can be moved along the sloped surface which, in turn, moves the longitudinal rail.

Kuhns, U.S. Pat. No. 6,419,431, issued Jul. 16, 2002, which is also incorporated by reference, discloses a second head hauler with a longitudinal rail whose vertical elevation and transverse horizontal position can be changed by a single person without tools. This head hauler is illustrated in FIG. 1. As with the earlier Kuhns patent, the adjustment mechanism includes an inclined bracket with a slotted sloped surface, an underlying plate, and an overlying plate that is attached to the movable longitudinal rail. In this mechanism, the underlying plate and the overlying plate are attached to each other with a hook. When the hook is moved into a particular position, the plates are loosened relative to each other and they can be moved along the sloped surface. The movement of the plates, in turn, moves the longitudinal rail.

In both of the Kuhns head haulers, a moderate amount of effort is needed to move the longitudinal rail after the plates are loosened relative to each other. There is also a danger that plates will loosen at an undesired time (such as during transport when the head hauler passes over bumps) and the longitudinal rail will slide downwardly. Accordingly, there is a demand for a head hauler with an improved means for adjusting the vertical elevation and transverse horizontal position of the movable longitudinal rail. More particularly, there is a demand for an adjustment means that can be operated by a single person without tools with minimal effort and without any possibility of movement of the longitudinal rail at an undesired time.

SUMMARY OF THE INVENTION

The general object of this invention is to provide an improved head hauler. A more particular object is to provide a head hauler with an adjustment means for the movable longitudinal rail that can be operated by a single person without tools with minimal effort and without any possibility of movement of the longitudinal rail at an undesired time.

I have invented head hauler comprising a chassis mounted on wheels. The chassis comprises: (a) a front transverse rail; (b) a rear transverse rail; (c) a fixed longitudinal rail on a first side that is fixed in vertical elevation and transverse horizontal position; and (d) a movable longitudinal rail on a second side that is movable without tools in vertical elevation and transverse horizontal position, the movable longitudinal rail being supported by two support assemblies, one on the front transverse rail and one on the rear transverse rail. Each support assembly comprises: (i) a transverse inclined bracket having an upper sloped surface that slopes downwardly in a direction toward the fixed longitudinal rail, the upper sloped surface having a slot; (ii) a screw extending parallel to and below the slot, the screw having a proximate end extending out of the bracket in a direction opposite the fixed longitudinal rail, the proximate end of the screw having a handle; (iii) a coupling attached to the bracket and through which the screw passes near its proximate end; (iv) a threaded coupling through which the screw passes; (v) an underlying plate that underlies the slot, the underlying plate being attached to the threaded coupling; and (vi) a means for attaching the plate to the movable longitudinal rail. Rotation of the screw causes the threaded coupling to move along the screw which, in turn, causes the underlying plate to move along and below the upper sloped surface of the transverse bracket which, in turn, causes the movable longitudinal rail to move along and above the upper sloped surface to change its vertical elevation and transverse horizontal position.

The movable longitudinal rail of the head hauler can be operated by a single person without tools with minimal effort and without any possibility of movement of the longitudinal rail at an undesired time.

DETAILED DESCRIPTION OF THE INVENTION

Figure 1:
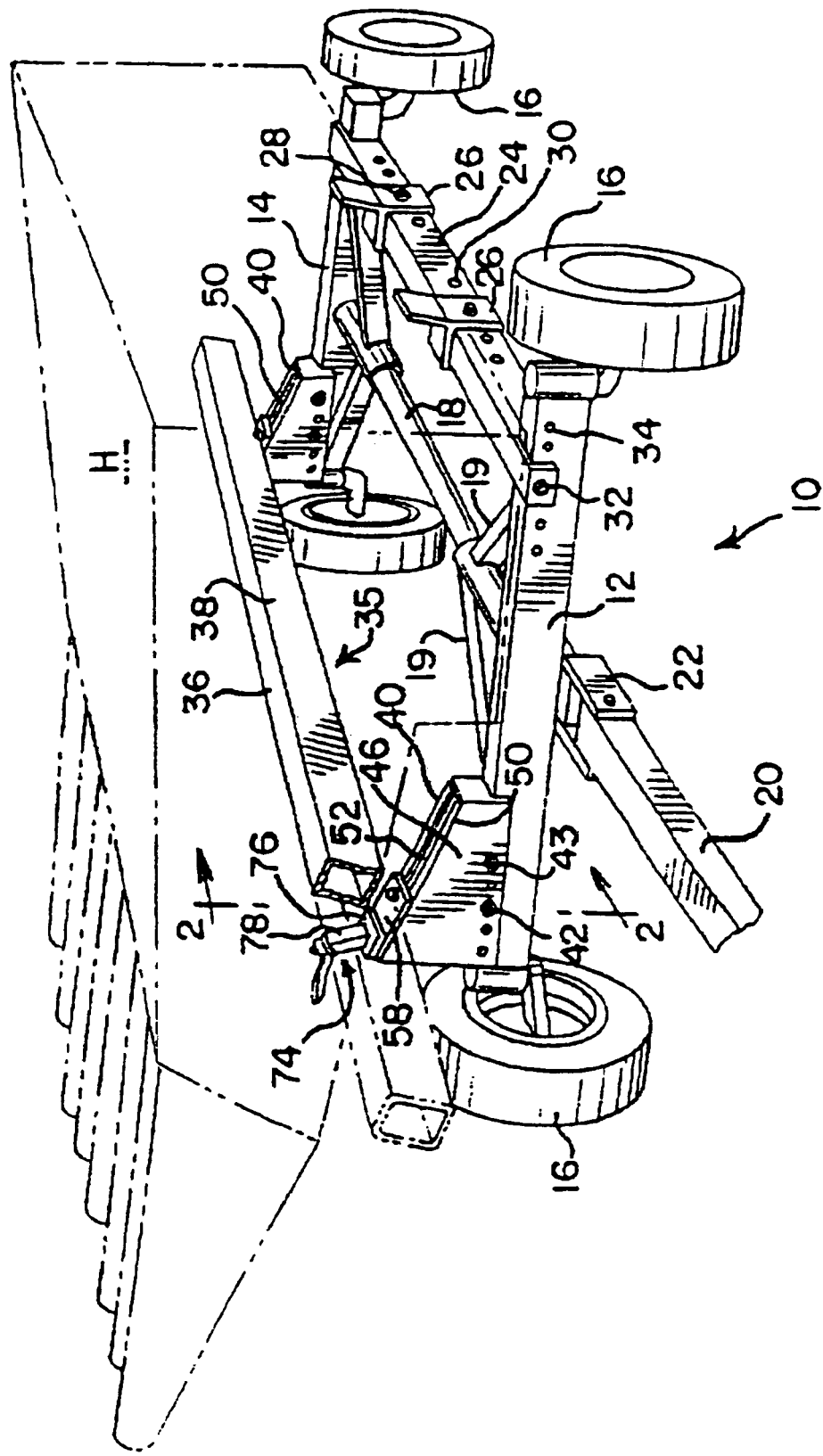
FIG. 1 is a perspective view of a prior art head hauler.

This invention is best understood by reference to the drawings. Referring to FIG. 1, a prior art head hauler 10 is shown carrying a head H that is shown in phantom lines. The head hauler comprises a chassis having a front transverse rail 12, a rear transverse rail 14, and four wheels 16 at the four corners. The rails are coupled to each other by a center beam 18. A tongue 20 is coupled to the front transverse rail by a coupling 22 that permits the tongue to both pivot and swivel. A first longitudinal rail 24 located on one side extends between the front and rear transverse rails. The first longitudinal rail is adjustably mounted on the front and rear transverse rails by means of bolts. However, the position of the first rail is not moved during common use and it is therefore referred to herein as the fixed longitudinal rail. One or more header support rest brackets 26 are mounted on the fixed longitudinal rail.

A second, movable longitudinal rail 38 is located on the opposite side of the chassis. The movable longitudinal rail rests on two support assemblies. The support assemblies comprise inclined brackets 40, one of which is mounted on the front transverse rail and one of which is mounted on the second transverse rail. The upper surface 50 of each bracket is sloped and contains a slot 52. The slot generally has a width of about one-half to two inches and preferably has a width of about three-fourths inch. An overlying plate 58 and an underlying plate (not seen in FIG. 1) are connected together. The overlying plate is attached to the movable longitudinal rail. It can be seen that movement of the plates along the slot causes the movable longitudinal rail to move along the sloped surface and to thereby change its vertical elevation and transverse horizontal position.

Figure 2:
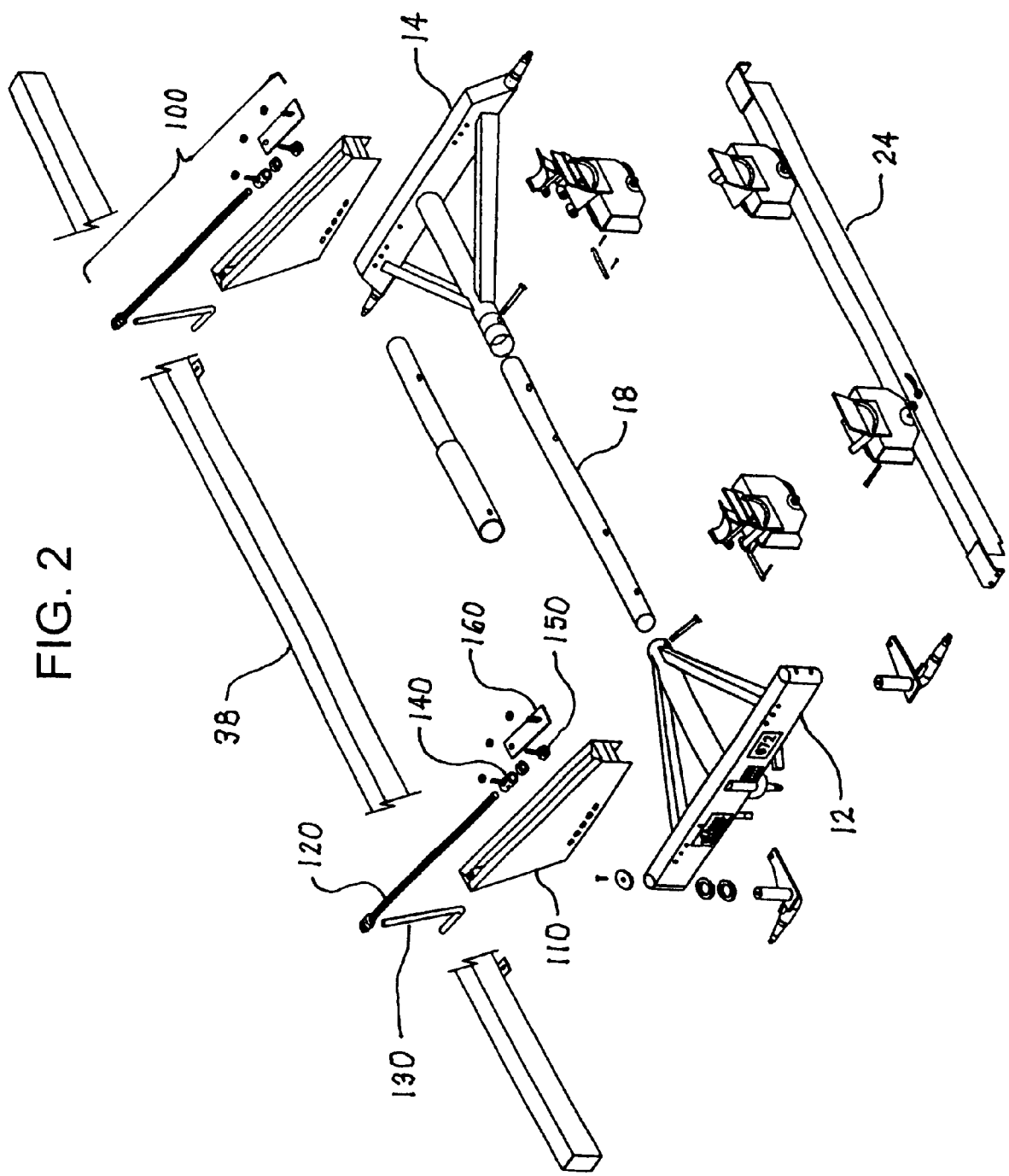
FIG. 2 is an exploded perspective view of the chassis of the head hauler of this invention.
Figure 3:
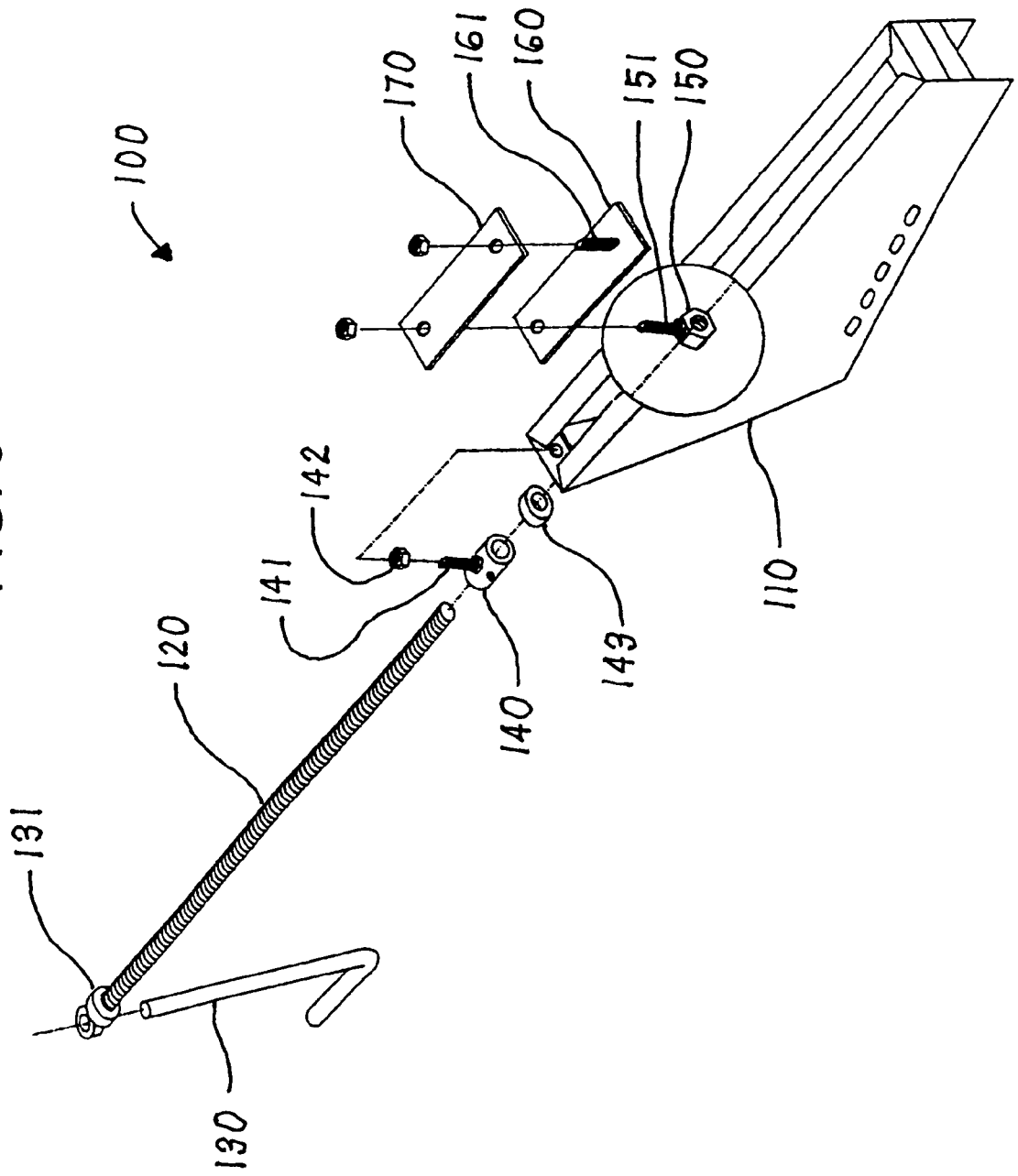
FIG. 3 is an exploded perspective view of the adjustment means thereof.

Referring now to FIGS. 2 and 3, the head hauler of this invention comprises two support assemblies 100 that replace the support assemblies of the prior art head hauler. Each support assembly comprises a transverse inclined bracket 110 having a upper sloped surface with a slot. The upper surface slopes downwardly in the direction toward the fixed longitudinal rail. In FIG. 2, the wheels and the tongue of the head hauler are omitted for clarity.

A threaded adjustment screw 120 extends parallel to and below the slot. In the preferred embodiment, the screw has a length of about two feet and a diameter of about three-fourths inch. The screw has a proximate end that extends out of the bracket in the direction opposite the fixed longitudinal rail. A crank handle 130 is attached to a handle fitting 131 mounted on the proximate end of the screw. The position of the crank handle in the fitting is preferably adjusted with a set screw. The adjustability enables the crank handle to be mounted in the fitting at its distal end for maximum leverage when clearance is not a problem. If clearance of the crank handle is a problem (for example, if the crank handle contacts a wheel or other obstruction), the crank handle is mounted in a position sufficiently far away from its distal end to avoid contact with the obstruction.

The adjustment screw passes through a screw support bracket 140 that is attached to the inclined bracket. In the preferred embodiment, the attachment means comprises a first stud 141 welded to the screw support bracket that passes through an opening in the inclined bracket and is secured with a nut 142. The stud preferably has a diameter of about one-half inch. The screw is held in place (i.e., its travel is limited) in the screw support bracket by the handle fitting at its proximate end and by a locking collar 143 at its distal end. The screw support bracket has a smooth interior surface and has a sufficiently large inside diameter to permit the screw to rotate freely relative to it.

The adjustment screw also passes through a threaded coupling, which in the preferred embodiment is a nut 150. The nut includes a second stud 151 that is attached to the exterior of the nut. The second stud extends upwardly through the slot, perpendicularly to the longitudinal axis of the screw that passes through the nut. The second stud enables the nut to be attached to an underlying plate 160 that underlies the slot. The underlying plate also contains a third stud 161 that extends upwardly through the slot. The second and third studs can be attached directly to the movable longitudinal rail. Alternatively, they can be attached to an overlying plate 170 that is, in turn, attached to the movable longitudinal rail. The underlying plate preferably has a width that is less than the width of the inclined bracket so that the underlying plate can pivot slightly, as described in detail below. The second and third studs also have a preferred diameter of about one-half inch.

The operation of support assemblies can now be considered. When the position of the movable longitudinal rail needs to be changed, one of the crank handles is grasped and the adjustment screw is rotated. Rotation of the adjustment screw causes the nut to move along the screw which, in turn, causes the underlying plate to move. This, in turn, causes the movable longitudinal rail to move. If two persons are making the movement, the rail can be moved at both support assemblies simultaneously so that the movable longitudinal rail remains "square" or parallel to the fixed longitudinal rail at all times.

If only one person is making the movement, the ability of the underlying plate to pivot about the second stud allows the longitudinal rail to move out of "square" and reduces the tendency of the longitudinal rail to bind. The ability to pivot is possible because the diameter of the studs is less than the width of the slot and because the width of the underlying plate is less than the width of the inclined bracket. Accordingly, if one person is making a movement of a few inches or less, the rail can be moved the entire distance at the first support assembly and then moved the entire distance at the second support assembly. If one person is making a movement of more than several inches, the rail is typically moved half the desired distance at the first support assembly, then moved the entire distance at the second support assembly, and then the remaining distance back at the first support assembly.

Movement of the movable longitudinal rail is easily made by simply turning the crank handle to rotate the adjustment screw. Rotating the adjustment screw requires very little effort. The movable longitudinal rail moves only when the adjustment screw rotates so there is no danger of it moving at an undesired time. Thus, there is never a need to handle the considerable weight of the movable longitudinal rail.

I claim:

1. A head hauler comprising a chassis mounted on wheels, the chassis comprising:
    (a) a front transverse rail;
    (b) a rear transverse rail;
    (c) a fixed longitudinal rail on a first side that is fixed in vertical elevation and transverse horizontal position;
    (d) a movable longitudinal rail on a second side that is movable without tools in vertical elevation and transverse horizontal position, the movable longitudinal rail being supported by two support assemblies, one on the front transverse rail and one on the rear transverse rail, each support assembly comprising:
        (i) a transverse inclined bracket having an upper sloped surface that slopes downwardly in a direction toward the fixed longitudinal rail, the upper sloped surface having a slot;
        (ii) a screw extending parallel to and below the slot, the screw having a proximate end extending out of the bracket in a direction opposite the fixed longitudinal rail, the proximate end of the screw having a handle;
        (iii) a coupling attached to the transverse bracket and through which the screw passes near its proximate end;
        (iv) a threaded coupling through which the screw passes;
        (v) an underlying plate that underlies the slot, the underlying plate being attached to the threaded coupling;
        (vi) a means for attaching the plate to the movable longitudinal rail;
    such that rotation of the screw causes the threaded coupling to move along the screw which, in turn, causes the underlying plate to move along and below the upper sloped surface of the transverse bracket which, in turn, causes the movable longitudinal rail to move along and above the upper sloped surface to change its vertical elevation and transverse horizontal position.

2. The head hauler of claim 1 wherein the underlying plate has a width less than the width of the transverse bracket.

3. The head hauler of claim 2 wherein the underlying plate is attached to the threaded coupling by means of a stud attached to the threaded coupling and extending perpendicularly to the screw.

4. The head hauler of claim 3 wherein the stud has a diameter, the slot has a width of about one-half to two inches, and wherein the diameter of the stud is less than the width of the slot so that the underlying plate can pivot about the stud within the transverse bracket.

5. The head hauler of claim 4 additionally comprising an overlying plate that overlies the slot and that is attached to the underlying plate and to the movable longitudinal rail.

* * * * *